United States Patent
Tang (10) Patent No.: US 10,740,800 B2
(45) Date of Patent: Aug. 11, 2020

(54) MODIFYING ADVERTISING POLICIES ENFORCED BY AN ONLINE SYSTEM BASED ON LIKELIHOOD OF USER INTERACTION WITH CONTENT ITEMS

(71) Applicant: Facebook, Inc., Menlo Park, CA (US)

(72) Inventor: Yi Tang, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 982 days.

(21) Appl. No.: 14/562,547

(22) Filed: Dec. 5, 2014

(65) Prior Publication Data

US 2016/0162953 A1 Jun. 9, 2016

(51) Int. Cl.
*G06Q 30/02* (2012.01)

(52) U.S. Cl.
CPC ..... *G06Q 30/0269* (2013.01); *G06Q 30/0275* (2013.01); *G06Q 30/0277* (2013.01)

(58) Field of Classification Search
USPC ...................................................... 705/14.43
See application file for complete search history.

(56) References Cited

U.S. PATENT DOCUMENTS

| | | | | |
|---|---|---|---|---|
| 2004/0267612 A1* | 12/2004 | Veach | ................... | G06Q 30/02 705/14.52 |
| 2009/0070190 A1* | 3/2009 | Gorty | ................... | G06Q 30/02 705/14.6 |
| 2014/0297400 A1* | 10/2014 | Sandholm | ................... | G06Q 30/0243 705/14.42 |

OTHER PUBLICATIONS

Lorna Woods, "The Consumer and Advertising Regulation in the Television without Frontiers and Audiovisual Media Services Directives," Jan. 16, 2008, J Consum Policy (2008) 31:63-77. (Year: 2008).*

* cited by examiner

*Primary Examiner* — Peter H Choi
*Assistant Examiner* — Christopher B Tokarczyk
(74) *Attorney, Agent, or Firm* — BakerHostetler LLP (57) ABSTRACT

An online system presents advertisements and content items to its users in a feed of content items (e.g., a newsfeed). The online system enforces one or more advertising policies regulating insertion of advertisements into the feed. For example, an advertising policy specifies a minimum distance between advertisements in the feed. Based on a likelihood of the user interacting with an advertisement, the online system may modify one or more of the advertising policies to increase a likelihood of the advertisement being included in the feed. For example, an advertising policy is modified if the user has at least a threshold likelihood of interacting with the advertisement. To modify an advertising policy, the online system may ignore the advertising policy when selecting content for the feed or may modify conditions limiting inclusion of advertisements in the feed specified by the advertising policy.

17 Claims, 3 Drawing Sheets

MODIFYING ADVERTISING POLICIES ENFORCED BY AN ONLINE SYSTEM BASED ON LIKELIHOOD OF USER INTERACTION WITH CONTENT ITEMS

BACKGROUND

This disclosure relates generally to presentation of content by an online system, and more specifically to requesting content items subject to one or more policies regulating locations of presented content items relative to each other.

An online system, such as a social networking system, allows its users to connect to and communicate with other users. Users may create profiles on an online system that are tied to their identities and include information about the users, such as interests and demographic information. The users may be individuals or entities such as corporations or charities. Establishing connections with other users via an online system allows a user to more easily share content with the other users. When the online system receives an interaction with content from a user, the online system stores information describing the interaction and may generate a content item describing the interaction that is presented to other online system users connected to the user in a feed of content items. Presenting users with content items describing interactions may increase user interaction with the online system.

Additionally, entities (e.g., a business) may present content items to online system users to gain public attention for products or services or to persuade online system users to take an action regarding products or services provided by the entity. Many online systems may receive compensation from an entity for presenting certain types of content items provided by the entity to online system users. Frequently, online systems charge an entity for each presentation of certain types of content to an online system user (e.g., each "impression" of the content) or for each interaction with the certain types of content by online system users.

To present the user with content with which the user is most likely to interact and to enhance user interaction with the online system, many online system enforce one or more policies regulating positions of certain types of content items in a feed of content items. For example, a policy prevents certain types of content items from being presented in specific locations in a feed of content item (e.g., a most prominent location, an initial location) so the feed presents other types of content items, which the online system determines are more likely to be of interest to users, in the specific locations of the feed of content items. However, enforcing one or more policies regulating positions of content items may reduce the likelihood of the user interacting with the feed of content items in certain scenarios by placing content items with which a user is likely to interact in less prominent locations within the feed of content items.

SUMMARY

An online system presents advertisements and content items to its users via a feed of content items (e.g., a newsfeed). To enhance user interaction, the online system enforces one or more advertising policies that regulate insertion and positioning of advertisements within the feed of content items. An advertising policy specifies one or more conditions that prevent insertion of one or more advertisements into a feed of content items. For example, advertising policies regulate positions in a feed of content items in which an advertisement may be presented, specify a minimum distance between separate advertisements in a feed of content items (e.g., a threshold number of pixels between advertisements presented by the feed), specify a maximum ratio of advertisements to content items in a feed, or specify other conditions regulating inclusion of advertisements in a feed.

However, certain advertisements may include content in which a user is likely to interact. For example, advertisements describing actions performed by additional users of the online system who are connected to the user via the social networking system are more likely to receive user interaction. As users may be likely to interact with advertisements including organic content (i.e., content describing actions performed by other social networking system users or content associated with one or more topics with which users presented with the advertisements have previously interacted or are likely to interact), enforcing advertising policies may prevent the user from being presented with content in which the user is likely to interact because the content is included in an advertisement. Hence, to increase the likelihood of a user interacting with a feed of content, the online system may modify one or more advertising policies based on likelihoods of the user interacting with advertisements from various advertisement requests ("ad requests"). This allows the feed of content to include additional advertisements with which the user has at least a threshold likelihood of interacting by relaxing or ignoring one or more of the advertising policies that would otherwise prevent inclusion of the additional advertisements in the feed. Thus, the social networking system uses the likelihood of the user interacting with an advertisement from an ad request as an indication of the quality of the content (i.e., relevance of the content to the user) included in an advertisement for presentation to a user; as the user is more likely to interact with higher-quality content, higher likelihoods of interaction provide an indication of an advertisement including higher quality content, which would warrant relaxation of one or more advertising policies limiting presentation of the advertisement. To determine whether to modify one or more advertising policies, the online system determines a likelihood that the user will perform one or more interactions with an advertisement based one prior interactions by a user with content items presented by the online system from information associated with the user by the online system The online system identifies prior interactions with content items presented to the user by the online system. In some embodiments, the online system identifies certain types of prior interactions (e.g., indicating a preference for content items, commenting on comments items, sharing comment items with additional users, etc.) or identifies prior interactions by the user with certain content items or with certain types of content items. For example, the online system identifies content items having at least a threshold number or threshold percentage of characteristics matching (or similar to) characteristics of an advertisement included in an ad request and identifies prior interactions by the user with the identified content items. Based on the prior interactions with the content items, the online system determines a likelihood of the user interacting with the advertisement. For example, a machine learned model is applied to the prior interactions with content items, characteristics of the content items, and characteristics of the advertisement to determine the likelihood of the user interacting with the advertisement.

Based on the likelihood of the user interacting with the advertisement, the online system determines whether to modify one or more advertising policies when selecting content for inclusion in the feed presented to the user. In one embodiment, if the likelihood of the user interacting with the advertisement is at least a threshold value, the online system modifies one or more of the advertising policies when selecting content for inclusion in a feed presented to the user when an ad request including the advertisement is identified as eligible for presentation to the user. Alternatively, the online system identifies content items and additional advertisements eligible for presentation to the user and determines likelihoods of the user interacting with the identified content items and additional advertisements. Based on the likelihood of the user interacting with the advertisement and the likelihoods of the user interacting with the content items and the additional advertisements, the online system determines whether to modify one or more of the advertising policies. For example, the online system ranks the likelihoods of the user interacting with the advertisement, with the additional advertisements, and with the content items; if the likelihood of the user interacting with the advertisement has at least a threshold position in the ranking, the online system modifies one or more of the advertising policies when selecting content for inclusion in the feed of content if the advertisement is eligible for presentation to the user.

In some embodiments, the online system 140 modifies an advertising policy by ignoring the advertising policy when selecting content for inclusion in the feed. For example, if the online system 140 ignores an advertising policy preventing presentation of an advertisement in a specific position of the newsfeed, when the online system selects content for inclusion in the newsfeed, the online system selects content without restricting positions in the feed in which advertisements are presented. Alternatively, the online system modifying one or more conditions specified by the advertising policy that prevent inclusion of an advertisement in the feed to increase a likelihood of the advertisement included in the ad request being selected for inclusion in the feed. For example, an advertising policy specifies a minimum distance between advertisements in a feed of content items, such as a minimum number of content items included in the feed between advertisements. If the online system determines the advertising policy should be modified, the online system decreases the minimum distance between advertisements included in the feed (e.g., reduces the number of content items included in the feed between advertisements). In some embodiments, the online system modifies one or more conditions specified by the advertising policy based on the likelihood of the user performing one or more interactions with the advertisement. For example, an amount by which a condition is modified is proportional to the likelihood of the user performing one or more interactions with the advertisement, which increases the likelihood of the advertisement being selected for inclusion in the feed as the likelihood of the user performing one or more interactions with the advertisement increases. As an example, the distance between advertisements in the feed is reduced by an amount that is proportional to the likelihood of the user performing one or more interactions with the advertisement, so a greater likelihood of the user performing one or more interactions with the advertisement results in a greater reduction of the distance between advertisements in the feed.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
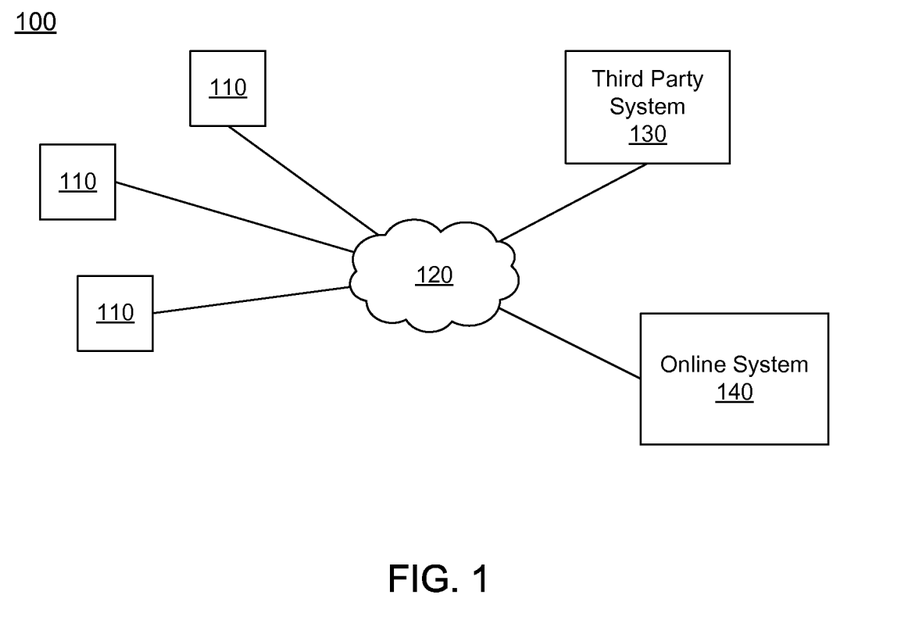
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, one or more advertisement services 135, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

Additionally, one or more advertisement services 135 are coupled to the network 120 to communicate with the online system 140 or with one or more third party systems 130. An advertisement service 135 identifies advertisements stored by the advertisement service 135 or by a third party system 130 and provides the identified advertisements to the online system 140 for presentation to users. For example, an advertisement service 135 receives a request for advertisements from the online system 140 and communicates advertisements to the online system 140 based on the request. Information describing one or more advertisements and/or information describing the user to whom advertisements are to be presented may be included in the request. Example information describing one or more advertisements included in the request include: a number of advertisements, a size of advertisements (e.g., a number of pixels specifying a height or a width of various advertisements), a type associated with advertisements (e.g., banner advertisement), a genre associated with advertisements (e.g., subject matter included in the advertisements), types of content included in the advertisements (e.g., video data, image data, audio data), bid amounts associated with advertisements, an operating system used to present the advertisements, and a type of client device 110 used to present the advertisements. Information describing a user to whom advertisements are to be presented include: targeting criteria associated with the user, a description of a client device 110 associated with the user, and an indication of an operating system associated with the user. Communication of advertisement requests from the online system 140 to an advertisement service 135 is further described below in conjunction with FIG. 3.

Figure 2:
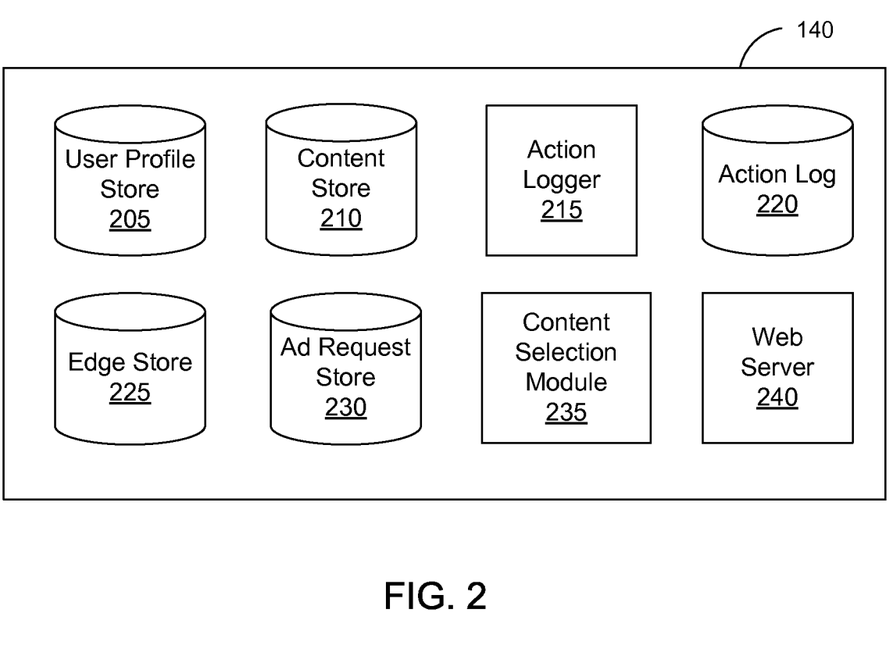
FIG. 2 is a block diagram of an online system, in accordance with an embodiment.

FIG. 2 is a block diagram of an architecture of the online system 140. An example of an online system 140 is a social networking system. The online system 140 shown in FIG. 2 includes a user profile store 205, a content store 210, an action logger 215, an action log 220, an edge store 225, an advertisement request ("ad request") store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an ad request by an advertiser and is used to determine an expected value, such as monetary compensation, provided by an advertiser to the online system 140 if advertisement content in the ad request is presented to a user, if the advertisement content in the ad request receives a user interaction when presented. For example, the bid amount specifies a monetary amount that the online system 140 receives from the advertiser if advertisement content in an ad request is displayed and the expected value is determined by multiplying the bid amount by a probability of the advertisement content being accessed.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The content selection module 235 selects one or more content items for communication to a client device 110 to be presented to a viewing user. Content items eligible for presentation to the viewing user are retrieved from the content store 210, or from another source, by the content selection module 235, which selects one or more of the content items for presentation to the viewing user. A content item eligible for presentation to the viewing user is a content item associated with at least a threshold number of targeting criteria satisfied by characteristics of the viewing user or is a content item that is not associated with targeting criteria. In various embodiments, the content selection module 235 includes content items eligible for presentation to the viewing user in one or more selection processes, which identify a set of content items for presentation to the viewing user. For example, the content selection module 235 determines a measure of relevance of various content items to the user based on characteristics associated with the user by the online system 140 based on the user's affinity for different content items and selects content items for presentation to the user based on the determined measures of relevance. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 235 uses the bid amounts associated with various content items when selecting content for presentation to the viewing user. In various embodiments, the content selection module 235 determines an expected value associated with various content items based on their bid amounts and selects content items associated with a maximum expected value or associated with at least a threshold expected value for presentation. An expected value associated with a content item represents an expected amount of compensation to the online system 140 for presenting a content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 may rank both content items and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the identified user. For example, stories or other data associated with users connected to the identified user are retrieved. Additionally, one or more advertisement requests ("ad requests") may be retrieved from the ad request store 230 The retrieved stories, ad requests, or other content items, are analyzed by the content selection module 235 to identify content likely to be relevant to the identified user. For example, stories associated with users not connected to the identified user or stories associated with users for which the identified user has less than a threshold affinity are discarded as candidate stories. Based on various criteria, the content selection module 235 selects one or more of the candidate stories for presentation to the identified user. Candidate stories or advertisements are selected for inclusion in the feed of content as described above.

In various embodiments, the content selection module 235 presents content to a user through a newsfeed including a plurality of content items selected for presentation to the user. One or more advertisements may also be included in the feed. The content selection module 235 may also determine the order in which selected content items or advertisements are presented via the feed. For example, the content selection module 235 orders content items or advertisements in the feed based on likelihoods of the user interacting with various content items or advertisements.

The content selection module 235 also maintains and enforces one or more advertising policies, where an advertising policy specifies one or more conditions that prevent insertion of one or more advertisements into a feed of content items. Example advertising policies include: advertisement policies identifying positions in a feed in which advertisements may not be presented (e.g., preventing advertisements from occupying the first position in a feed), advertisement policies identifying position in a feed of content in which advertisements are capable of being presented, an advertising policy specifying a ratio of advertisements and other types of content items presented by the feed of content, advertisement policies specifying a minimum number of content items between advertisements in the feed of content, and advertisement policies specifying a minimum distance between advertisements presented by a feed of content (e.g., a minimum number of pixels between advertisements presented in the feed of content, a minimum number of positions between advertisements presented in the feed of content). For example, an advertising policy prevents an advertisement from being presented within five positions of a position in a feed of content in which another advertisement is presented. As an additional example, an advertising policy specifies a minimum of 480 pixels between advertisements presented in a feed of content.

To increase the likelihood of a user interacting with a feed of content, the content selection module 235 may modify one or more advertising policies based on likelihoods of the user interacting with advertisements from various ad requests. This allows the feed of content to include additional advertisements with which the user has at least a threshold likelihood of interacting by relaxing or ignoring one or more of the advertising policies that would otherwise prevent inclusion of the additional advertisements in the feed. To determine whether to modify one or more advertising policies, the content selection module 235 determines a likelihood of the user performing one or more interactions with an advertisement based one prior interactions by a user with content items presented by the online system 140 from information associated with the user by the online system 140.

The content selection module 235 retrieves information from the content store 210 and from the action log 220 identifying prior interactions with content items presented to the user by the online system 140. In some embodiments, the content selection module 235 retrieves certain types of interactions from the action log 220 (e.g., indicating a preference for content items, commenting on comments items, sharing comment items with additional users, etc.) or retrieves interactions by the user with certain content items. For example, the content selection module 235 identifies content items having at least a threshold number or threshold percentage of characteristics matching (or similar to) characteristics of an advertisement included in an ad request and identifies prior interactions by the user with the identified content items. Based on the prior interactions with the content items, the content selection module 235 determines a likelihood of the user interacting with the advertisement. For example, a machine learned model is applied to the prior interactions with content items, characteristics of the content items, and characteristics of the advertisement to determine the likelihood of the user interacting with the advertisement.

Based on the likelihood of the user interacting with the advertisement, the content selection module 235 determines whether to modify one or more advertising policies when selecting content for inclusion in the feed presented to the user. In one embodiment, if the likelihood of the user interacting with the advertisement is at least a threshold value, the content selection module 235 modifies one or more of the advertising policies when selecting content for inclusion in a feed presented to the user when an ad request including the advertisement is identified as eligible for presentation to the user. Alternatively, the content selection module 235 identifies content items and additional advertisements eligible for presentation to the user and determines likelihoods of the user interacting with the identified content items and additional advertisements. Based on the likelihood of the user interacting with the advertisement and the likelihoods of the user interacting with the content items and the additional advertisements, the content selection module 235 determines whether to modify one or more of the advertising policies. For example, the content selection module 235 ranks the likelihoods of the user interacting with the advertisement, with the additional advertisements, and with the content items; if the likelihood of the user interacting with the advertisement has at least a threshold position in the ranking, the content selection module 235 modifies one or more of the advertising policies when selecting content for inclusion in the feed of content if the advertisement is eligible for presentation to the user. Modification of one or more advertising policies based on the likelihood of user interaction with an advertisement when providing a feed of content to a user is further described below in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Figure 3:
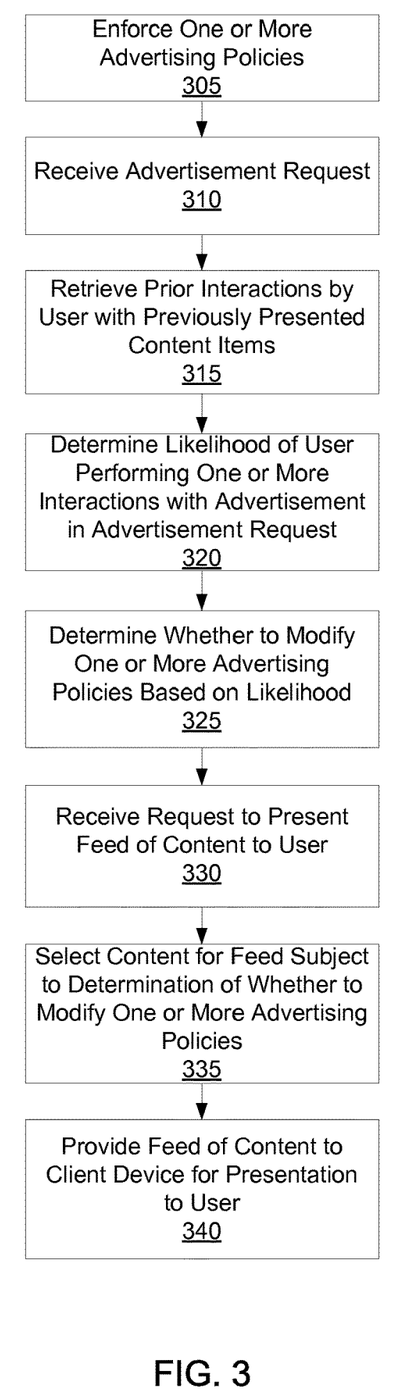
FIG. 3 is a flowchart of a method a method for modifying advertising policies based on a likelihood of a user interacting with an advertisement, in accordance with an embodiment.

Modifying Advertising Policies Based on Likelihood of User Interaction with an Advertisement FIG. 3 is a flowchart of one embodiment of a method for modifying advertising policies based on a likelihood of a user interacting with an advertisement. In other embodiments, the method may include different and/or additional steps than those shown in FIG. 3. Additionally, steps of the method may be performed in different orders than the order described in conjunction with FIG. 3.

The online system 140 maintains and enforces 305 one or more advertising policies. As described above in conjunction with FIG. 2, advertising policies prevent insertion of an advertisement into a feed of content items by specifying positions in the feed in which advertisements are not eligible to be presented, by specifying by specifying a minimum distance separating advertisements in the feed, or by specifying any other suitable conditions preventing inclusion of an advertisement in the feed. When generating a feed of content for presentation to a user, the online system 140 enforces 305 one or more of the advertising policies to regulate placement of advertisements in the feed to increase the likelihood of the user interacting with the feed.

The online system 140 receives 310 an advertisement request ("ad request") that includes an advertisement and a bid amount. As described above in conjunction with FIG. 2, the bid amount specifies an amount of compensation provided by a user associated with the ad request (e.g., an advertiser) to the online system 140 if the advertisement included in the ad request is presented to one or more users or if one or more online system users interact with the presented advertisement. The advertisement included in the ad request includes content for presentation to one or more online system users. Additionally, the ad request includes one or more characteristics. Example characteristics of the ad request include an advertising campaign including the ad request, the advertiser associated with the ad request, a description of the content of the advertisement (e.g., an image identifier, text in the advertisement, an identifier of video included in the advertisement, an identifier of audio data included in the advertisement), a landing page included in the advertisement, and one or more topics associated with the advertisement. The online system 140 may extract topics from the advertisement, as described in U.S. patent application Ser. No. 13/167,701, filed Jun. 24, 2011, which is hereby incorporated by reference in its entirety, or a user providing the ad request includes topics associated with the advertisement in the ad request.

After receiving the ad request, the online system 140 retrieves 315 prior interactions by a user of the online system 140 with content items previously presented to the user by the online system 140. In one embodiment, then the advertisement included in the ad request is identified by the online system 140 as eligible for presentation to the user, the online system 140 retrieves 315 the prior interactions by the user with the content items previously presented to the user by the online system. For example, when the online system 140 receives a request for content from a client device 110 associated with the user, the online system 140 determines whether the advertisement included in the ad request is eligible for presentation to the user; if the advertisement is eligible for presentation to the user, the online system 140 retrieves 315 prior interactions by the user with content items previously presented to the user via the online system 140. Additionally, the online system 140 may retrieve affinities of the user for a user associated with the ad request or for topics associated with the ad request from the edge store 225.

In some embodiments, the online system 140 retrieves 315 certain types of prior interactions by the user or retrieves 315 prior interactions with certain types of content items. For example, the online system 140 retrieves 315 prior interactions where the user indicated a preference for content items or where the user shared content items with additional online system users. As another example, the online system 140 retrieves prior interactions by the user with content items associated with a user that is also associated with the ad request or prior interactions by the user with content items having at least a threshold number or percentage of characteristics matching characteristics of the ad request.

Based on the retrieved prior interactions with content items, the online system 140 determines 320 a likelihood of the user performing one or more interactions with the advertisement included in ad request. In some embodiments, the online system 140 may apply a machine learned model to characteristics of content items with which the user previously interacted, characteristics of the ad request, and types of prior interactions to determine 320 the likelihood of the user interacting with the ad request. Additional information may be used to determine 320 the likelihood of the user interacting with the ad request. For example, affinities of the user for one or more topics associated with the ad request or an affinity of the user for an advertiser associated with the ad request may be used when determining 320 the likelihood of the user interacting with the ad request. In some embodiments, the online system 140 determines 320 a likelihood of the user performing one or more types of interactions with the advertisement included in the ad request. Alternatively, the online system 140 determines 320 a likelihood of the user performing a specific type of interaction with the advertisement included in the ad request (e.g., access the advertisement, provide a comment associated with the advertisement). Calculating a likelihood of the user interacting with the ad request, or calculating an expected amount of interaction with an ad request is further described in U.S. patent application Ser. No. 12/978,265, filed on Dec. 23, 2010, and U.S. patent application Ser. No. 13/545,266, filed on Jul. 10, 2012, each of which is hereby incorporated by reference in its entirety.

The online system 140 determines 325 whether to modify one or more of the advertising policies enforced by the online system 140 based on the likelihood of the user interacting with the advertisement included in the ad request. While enforcement of the advertising policies limits presentation of advertisements in a feed of content presented to the user to increase user interaction with the feed, if a user has a sufficient likelihood of interacting with an advertisement, including the advertisement in the feed may be more conducive to the user interacting with the feed than enforcing one or more of the advertising policies. In one embodiment, the online system 140 determines 325 whether the likelihood of the user interacting with the advertisement included in the ad request equals or exceeds a threshold value. If the likelihood of the user interacting with the advertisement included in the ad request equals or exceeds the threshold value, the online system 140 modifies one or more of the advertising policies. However, if the likelihood of the user interacting with the advertisement included in the ad request is less than the threshold value, the online system 140 continues to enforce the one or more advertising policies without modification.

In some embodiments, the online system 140 determines likelihoods of the user performing one or more interactions with additional advertisements or with content items identified as eligible for presentation to the user and determines 325 whether to modify one or more of the advertising policies. For example, the online system 140 identifies content items eligible for presentation to the user (e.g., content items associated with additional users connected to the user) and determines likelihoods of the user interacting with various identified content items based on prior interactions or additional information associated with the user. Similarly, the online system 140 identifies advertisements included in ad requests having targeting criteria satisfied by characteristics of the user and determines likelihoods of the user performing one or more interactions with various additional advertisements based on prior interactions by the user, as described above. The online system 140 ranks the likelihoods of the user performing one or more interactions with the identified content items, with the additional advertisement, and with the advertisement. Based on the ranking, the online system 140 determines 325 whether to modify one or more of the advertising policies enforced by the online system 140. For example, if the likelihood of the user interacting with the advertisement included in the ad request has at least a threshold position in the ranking, the online system 140 modifies one or more of the advertising policies, while maintaining the advertising policies without modification if the likelihood of the user interacting with the advertisement in the ad request has less than the threshold position in the ranking.

When the online system 140 receives 330 a request to present a feed of content to the user, the online system 140 selects 335 content for inclusion in the feed from the advertisement included in the ad request, content items eligible for presentation to the user, and additional advertisements subject to the determination of whether to modify one or more of the advertising policies. In some embodiments, the online system 140 modifies an advertising policy by ignoring the advertising policy when selecting 335 content for inclusion in the feed. For example, if the online system 140 ignores an advertising policy preventing presentation of an advertisement in a specific position of the newsfeed, when the online system 140 selects 335 content for inclusion in the newsfeed, the online system 140 selects content without restricting positions in the feed in which advertisements are presented.

The online system 140 may alternatively modify an advertising policy by modifying one or more conditions specified by the advertising policy that prevent inclusion of an advertisement in the feed to increase a likelihood of the advertisement included in the ad request being selected 335 for inclusion in the feed. For example, an advertising policy specifies a minimum distance between advertisements in a feed of content items, such as a minimum number of content items included in the feed between advertisements. If the online system 140 determines 325 the advertising policy should be modified, the online system 140 decreases the minimum distance between advertisements included in the feed (e.g., reduces the number of content items included in the feed between advertisements). In some embodiments, the online system 140 modifies one or more conditions specified by the advertising policy based on the likelihood of the user performing one or more interactions with the advertisement. For example, an amount by which a condition is modified is proportional to the likelihood of the user performing one or more interactions with the advertisement, which increases the likelihood of the advertisement being selected 335 for inclusion in the feed as the likelihood of the user performing one or more interactions with the advertisement increases. As an example, the distance between advertisements in the feed is reduced by an amount that is proportional to the likelihood of the user performing one or more interactions with the advertisement, so a greater likelihood of the user performing one or more interactions with the advertisement results in a greater reduction of the distance between advertisements in the feed. In some embodiments, different advertising policies may be differently modified based on the determination by the online system 140.

To select 335 content for inclusion in the feed, the online system 140 may rank both content items, the ad request, and additional ad requests in a unified ranking based on bid amounts associated with the ad request and with the additional ad requests as well as measures of relevance associated with content items, with the ad requests, and with the additional ad requests. Based on the unified ranking, the online system 140 selects 335 content for presentation to the user. For example, the online system 335 selects content having a least a threshold position in the ranking for inclusion in the feed of content items. Selecting ad requests and other content items through a unified ranking is further described in U.S. patent application Ser. No. 13/545,266, filed on Jul. 10, 2012, which is hereby incorporated by reference in its entirety. Alternatively, the online system 140 ranks content items based on likelihoods of the user performing one or more interactions with the content items and separately ranks the ad request and the additional ad requests based on bid amounts associated with the ad request and the additional ad requests as well as likelihoods of the user performing one or more interactions with the ad request or with the additional ad requests. Based on the ranking of content items and the ranking of the additional ad requests and the ad request, the online system 140 selects 335, respectively, content for inclusion in the feed of content items and one or more advertisements included in the ad request or included in one or more additional ad requests for inclusion in the feed of content. When selecting 335 content for inclusion in the feed, the online system 140 enforces the one or more advertising policies or one or more of the advertising policies to regulate the number of advertisements included in the content feed. Examples of selection of content for inclusion in the feed are described below in conjunction with FIGS. 4A and 4B.

The feed of content including the selected content is provided 340 from the online system 140 to a client device 110 associated with the user for presentation. For example, the online system 140 communicates the feed of content to a client device 110 from which the request to present the feed of content to the user was received 330. As another example, the online system 140 stores the feed of content and subsequently communicates the feed to a client device 110 associated with the user when a request for the feed is received from the client device 110.

While FIG. 3 describes modifying one or more advertising policies regulate insertion and positioning of advertisements within the feed of content items, the method described in conjunction with FIG. 3 may be applied to modify policies regulating insertion or position of advertisements within other content provided via the online system 140. In one embodiment, the online system 140 allows its users to exchange messages with each other and presents a user with a thread including multiple messages exchanged between users. For example, the thread includes messages exchanged between the user and an additional user. Alternatively, the thread includes messages between the user and multiple additional users. An application associated with the online system 140 may execute on client devices 110 associated with various users; the application communicates messages received from a user to the online system 140 for presentation to one or more additional users via a thread and presents messages received from one or more other users to the user via the online system 140 to the user via a thread. In some embodiments, the online system 140 may include one or more advertisements in a thread presented to a user along with messages for presentation to the user and enforce one or more advertising policies regulating presentation insertion or position of advertisements within other the thread of messages. As described above in conjunction with FIG. 3, the online system 140 may determine a likelihood of the user interacting with the advertisement and modify (e.g., ignore, relax) one or more advertising policies when determining whether to include the advertisement in a thread of messages presented to the user via the online system 140 based on the likelihood of the user interacting with the advertisement.

Selecting Content Items for Inclusion a Feed of Content

Figure 4A:
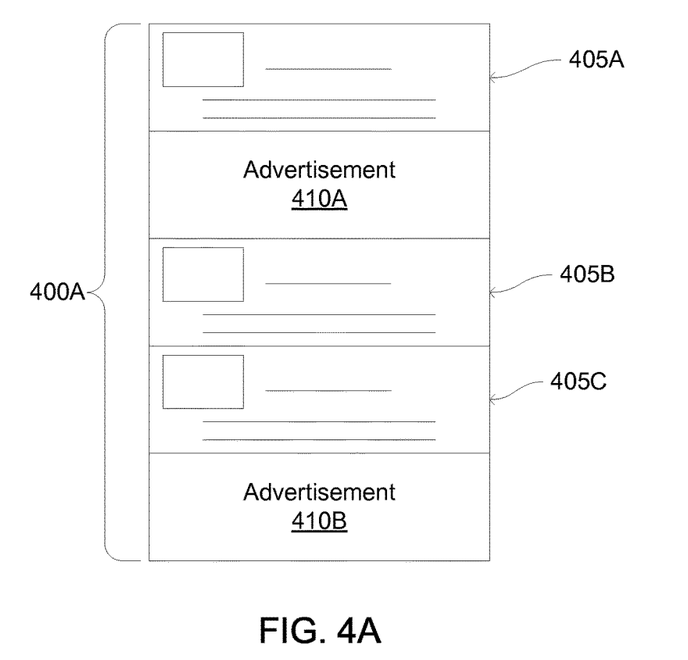
FIGS. 4A and 4B are examples of feeds of content selected subject to modification of one or more advertising policies enforced by an online system, in accordance with an embodiment.
Figure 4B:
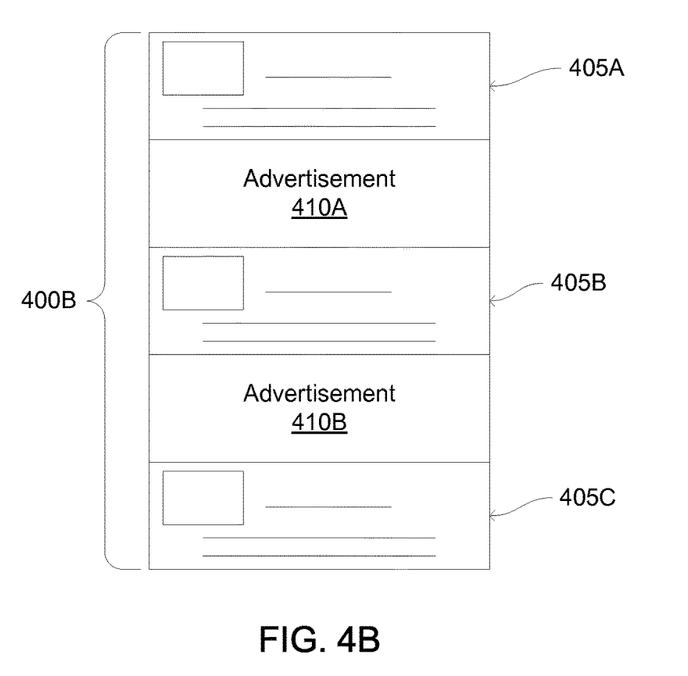

FIGS. 4A and 4B show example feeds of content selected based on whether one or more advertising policies enforced by the online system 140 are modified. In the example of FIG. 4A, the feed 400A of content items presented to a user includes content items 405A, 405B, 405C (also referred to individually and collectively using reference number 405) and advertisements 410A, 410B (also referred to individually and collectively using reference number 410). When generating the feed 400A of content items, the online system 140 enforces an advertisement policy specifying a minimum distance of two positions of the feed between advertisements. Hence, content items 405B, 405C are included in the feed between advertisement 410A and advertisement 410B.

However, the online system 140 may modify the advertising policy when selecting content if the user has at least a threshold likelihood of performing one or more interactions with advertisement 405B. As described above in conjunction with FIGS. 2 and 3, the online system 140 retrieves prior interactions by the user with content items to determine the likelihood of the user performing one or more interactions with advertisement 405B. In the example of FIG. 4B, the likelihood of the user performing one or more interactions with advertisement 405B has at least a threshold value or has at least a threshold position in a ranking of the user performing one or more interactions with content items or advertisements eligible for presentation to the user. Hence, the online system 140 modifies the advertising policy to reduce the minimum distance between advertisements to one position. The online system 140 generates the feed 400B by selecting content subject to the modified advertising policy. Accordingly, the feed 400B includes advertisement 410A and advertisement 410B separated by content item 405B. For example, the online system 140 determines that the likelihood of the user interacting with content item 405C is less than a combination of a bid amount associated with advertisement 410B and a likelihood of the user interacting with advertisement 410B. Because the modified advertising policy reduces the minimum distance between advertisements in the feed 400B, advertisement 410B is presented within one position of advertisement 410A in the feed 400B; however, without modifying the advertising policy, the online system 140 generates the feed 400A in the preceding example based on the minimum distance of two positions between advertisements, despite the combination of the bid amount and likelihood of the user interacting with of advertisement 410B exceeding the likelihood of the user interacting with content item 405C.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

maintaining, by an online system, one or more advertising policies identifying one or more positions in a newsfeed of content items in which advertisements may not be presented, the online system presenting content items and advertisements to a user of the online system in the newsfeed within a limited display space in a user interface;

receiving, by the online system, information describing an advertisement request from an advertiser;

retrieving prior interactions by the user with content items presented by the online system from information maintained by the online system;

determining a likelihood of the user performing one or more interactions with the advertisement included in the advertisement request based at least in part on the prior interactions by the user with the content items presented by the online system;

determining that the likelihood of the user performing the one or more interactions with the advertisement including the advertisement request is greater than a threshold likelihood;

responsive to determining that the likelihood of the user performing the one or more interactions with the advertisement is greater than the threshold likelihood, generating a modification to the one or more of the advertising policies, the modification to the one or more advertising policies allowing insertion of the advertisement into a position in the newsfeed identified by the one or more advertising policies as one of the identified positions in the newsfeed of content items in which advertisements may not be presented;

selecting, for inclusion in the newsfeed in compliance with the generated modification, the advertisement for inclusion in the newsfeed in the position identified by the one or more advertising policies, a plurality of content items, and one or more additional advertisements; and providing, by the online system, the newsfeed including the selected content items and advertisements within the limited display space in the user interface to a client device for presentation to the user.

2. The method of claim 1, wherein the threshold value is based at least in part on likelihoods of the user interacting with one or more content items identified as eligible for inclusion in the newsfeed of content items.

3. The method of claim 1, wherein generating the modification to the one or more of the advertising policies comprises:

determining likelihoods of the user interacting with one or more content items identified as eligible for inclusion in the newsfeed based on prior interactions by the user with content items;

ranking the likelihood of the user interacting with the advertisement and the likelihoods of the user interacting with the one or more content items identified as eligible for inclusion in the newsfeed; and modifying one or more of the advertising policies if the likelihood of the user performing one or more interactions with the advertisement has at least a threshold position in the ranking.

4. The method of claim 1, wherein generating the modification to the one or more of the advertising policies comprises:
   determining to modify one or more of the advertising policies; and
   ignoring one or more of the advertising policies in response to determining to modify one or more of the advertising policies.

5. The method of claim 1, wherein generating the modification to the one or more of the advertising policies comprises:
   determining to modify one or more of the advertising policies; and
   modifying one or more advertising policies to increase a likelihood of the advertisement being selected for inclusion in the newsfeed of content items.

6. The method of claim 5, wherein modifying one or more advertising policies comprises:
   modifying an advertising policy based at least in part on the likelihood of the user performing one or more interactions with the advertisement included in the advertisement request.

7. The method of claim 1, wherein the one or more advertising policies include a minimum distance between positions in which advertisements are presented in the newsfeed.

8. The method of claim 1, wherein the one or more advertising policies include a minimum number of content items presented in the newsfeed between advertisements presented in the newsfeed.

9. The method of claim 1, wherein selecting, for inclusion in the newsfeed in compliance with the generated modification, the advertisement for inclusion in the newsfeed in the position identified by the one or more advertising policies, a plurality of content items, and one or more additional advertisements comprises:
   ranking the advertisement for inclusion in the position, the plurality of content items, and the one or more additional advertisements based at least in part on a bid amount associated with the advertisement for inclusion in the position and bid amounts associated with the one or more additional advertisements; and
   selecting content items for presentation to the user via the newsfeed of content items based at least in part on the ranking and the generated modification.

10. A computer program product comprising a non-transitory computer readable storage medium having instructions encoded thereon that, when executed by a processor, cause the processor to:
    maintain, by an online system, one or more advertising policies identifying one or more positions in a newsfeed of content items in which advertisements may not be presented, the online system presenting content items and advertisements to a user of the online system in the newsfeed within a limited display space in a user interface;
    receive, by the online system, information describing an advertisement request from an advertiser;
    retrieve prior interactions by the user with content items presented by the online system from information maintained by the online system;
    determine a likelihood of the user performing one or more interactions with the advertisement included in the advertisement request based at least in part on the prior interactions by the user with the content items presented by the online system;
    responsive to determining that the likelihood of the user performing the one or more interactions with the advertisement is greater than a threshold likelihood, generate a modification to the one or more of the advertising policies, the modification to the one or more advertising policies allowing insertion of the advertisement into a position in the newsfeed identified by the one or more advertising policies as one of the identified positions in the newsfeed of content items in which advertisements may not be presented;
    select, for inclusion in the newsfeed in compliance with the generated modification, the advertisement for inclusion in the newsfeed in the position identified by the one or more advertising policies, a plurality of content items, and one or more additional advertisements; and
    provide, by the online system, the newsfeed including the selected content items and advertisements to a client device within the limited display space in the user interface of the client device for presentation to the user.

11. The computer program product of claim 10, wherein the threshold value is based at least in part on likelihoods of the user interacting with one or more content items identified as eligible for inclusion in the newsfeed of content items.

12. The computer program product of claim 10, wherein generate the modification to the one or more of the advertising policies based at least in part on the likelihood of the user performing one or more interactions with the advertisement included in the advertisement request comprises:
    determine likelihoods of the user interacting with one or more content items identified as eligible for inclusion in the newsfeed based on prior interactions by the user with content items;
    rank the likelihood of the user interacting with the advertisement and the likelihoods of the user interacting with the one or more content items identified as eligible for inclusion in the newsfeed; and
    modify one or more of the advertising policies if the likelihood of the user performing one or more interactions with the advertisement has at least a threshold position in the ranking.

13. The computer program product of claim 10, wherein generate the modification to the one or more of the advertising policies based at least in part on the likelihood of the user performing one or more interactions with the advertisement included in the advertisement request comprises:
    determine to modify one or more of the advertising policies; and
    ignore one or more of the advertising policies in response to determining to modify one or more of the advertising policies.

14. The computer program product of claim 10, wherein generate the modification to the one or more of the advertising policies based at least in part on the likelihood of the user performing one or more interactions with the advertisement included in the advertisement request comprises:
    determine to modify one or more of the advertising policies; and
    modify one or more advertising policies to increase a likelihood of the advertisement being selected for inclusion in the newsfeed of content items.

15. The computer program product of claim 14, wherein modify one or more advertising policies comprises:
    modify an advertising policy based at least in part on the likelihood of the user performing one or more interactions with the advertisement included in the advertisement request.

16. The computer program product of claim 10, wherein the one or more advertising policies include a minimum distance between positions in which advertisements are presented in the newsfeed.

17. The computer program product of claim 10, wherein select, for inclusion in the newsfeed in compliance with the generated modification, the advertisement for inclusion in the newsfeed in the position identified by the one or more advertising policies, a plurality of content items, and one or more additional advertisements comprises:
- rank the advertisement for inclusion in the position, the plurality of content items, and the one or more advertisements based at least in part on a bid amount associated with the advertisement for inclusion in the position and the amounts associated with the one or more additional advertisements; and
- select content items for presentation to the user via the newsfeed of content items based at least in part on the ranking and the generated modification.

\* \* \* \* \*